W. A. TURBAYNE.
DYNAMO ELECTRIC MACHINE.
APPLICATION FILED MAR. 27, 1916. RENEWED AUG. 30, 1920.

1,366,546.

Patented Jan. 25, 1921.
2 SHEETS—SHEET 1.

Witnesses
B. H. Caldwell
Ralph Munden

Inventor
William A. Turbayne
By Raymond H. Van Nest
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,366,546.                Specification of Letters Patent.       Patented Jan. 25, 1921.

Application filed March 27, 1916, Serial No. 86,971. Renewed August 30, 1920. Serial No. 407,064.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

The present invention relates to improvements in dynamo electric machines.

More particularly the invention relates to dynamo-electric machines which in service are subject to wide variations in speed and in which it is desired to keep the output substantially constant. This result has generally been accomplished heretofore in practice by employing a regulator in the field circuit to vary the field resistance as the output tends to increase. This regulator is mechanically or electromagnetically operated.

In some recent systems the generator output has been maintained at the proper value without the use of an external regulator. The present invention relates to such inherently regulated dynamo-electric machines.

Some of the inherently regulated dynamo-electric machines though they operate satisfactorily at relatively low speeds, have such small voltages impressed across their field windings at high speeds that small variations in brush and commutator conditions will have relatively great effects on the field voltage, resulting in erratic performances on the part of said dynamo-electric machines.

An object of the present invention is to provide improved means whereby the dynamo electric machine will be regulated to prevent a substantial rise in current output with increases in speed.

A further object is to provide a generator of the inherently regulated type having improved stability of action at all speeds.

Further objects will appear as the description proceeds.

Referring to the drawings:—

Figure 1:
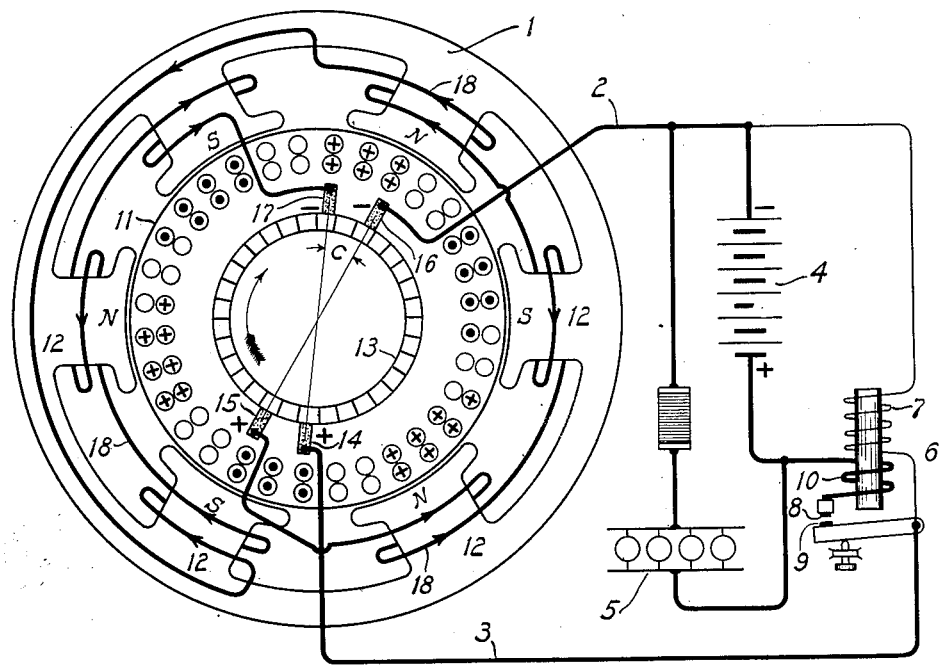
Figure 1 represents diagrammatically a system employing an improved dynamo electric machine, according to the present invention.

In Fig. 1, the dynamo-electric machine is indicated as a whole by the numeral 1. Said dynamo-electric machine supplies mains 2, 3, across which a storage battery 4 and lamps 5 are connected in parallel branches. An automatic switch 6 is connected in one of the main leads. This switch has a shunt lifting coil 7 adapted, when sufficiently energized, to close the main circuit between the generator and battery at the contacts 8 and 9. The switch also has a series holding coil 10 in series in one of the generator leads and in series with the contacts 8 and 9. The switch 6 is of any preferred construction. It is adapted to close the main circuit when the generator voltage substantially equals the battery voltage. When the generator is at rest or operating at low speed, the battery tends to discharge through the generator and hence the current is reversed in the holding coil 10, which then opposes the lifting coil 7 and causes the switch to open.

The dynamo-electric machine has a rotating armature and a stationary field. The armature may be either of the Gramme or drum types. In the embodiment of the invention herein chosen to illustrate the principles of the invention, the armature 11 is of the drum type and the field has six symmetrically arranged poles 12. The armature is provided with a two-path series wave winding having symmetrical end connections, so that points of maximum difference of potential on the commutator 13 will be in line with the centers of poles of opposite polarity spaced substantially 180 electrical degrees apart.

Referring to Fig. 1, it will be noted that four brushes bear on the commutator 13. Two of these brushes 15 and 16, are placed directly in the center line of opposite poles, while the other two brushes 14 and 17 are placed back of the former in a position determined by the angle C. The field winding comprising the conductor 18, encircling the poles 12, is connected between brushes 15 and 17, while the external circuit is supplied through brushes 14 and 16. The effects of this arrangement are best illustrated by reference to Fig. 2, which gives a development of the armature windings and which indicates, by means of arrow-heads, the direction of current in the armature conductors. The distribution of voltage around the commutator under light load and under loaded conditions, is illustrated by the full line and dotted line curves respectively, the ordinates indicating representative voltage values. Under light load conditions the brushes 14 and 16, supplying the outside circuit, bear on the commutator at points having a potential difference of approximately 13½ volts. The brushes 15 and 17, which excite the field circuit, are shown as bearing on the commutator at points having a potential difference of approximately 13½ volts. An exciting current will therefore flow in the field winding, its direction in the various armature conductors being represented by the lower row of arrows in Fig. 2. After the automatic switch closes and current is supplied to the outside circuit, current will flow in the armature conductors in the direction illustrated by the upper row of arrows. In certain of the armature conductors, the sum of the field and load currents will flow, while in others only the difference between these currents will flow. This condition is best represented in Fig. 1, in which the conductors carrying the sum of the two currents are indicated by the crosses and dots, while those carrying the difference are left blank.

Figure 2:
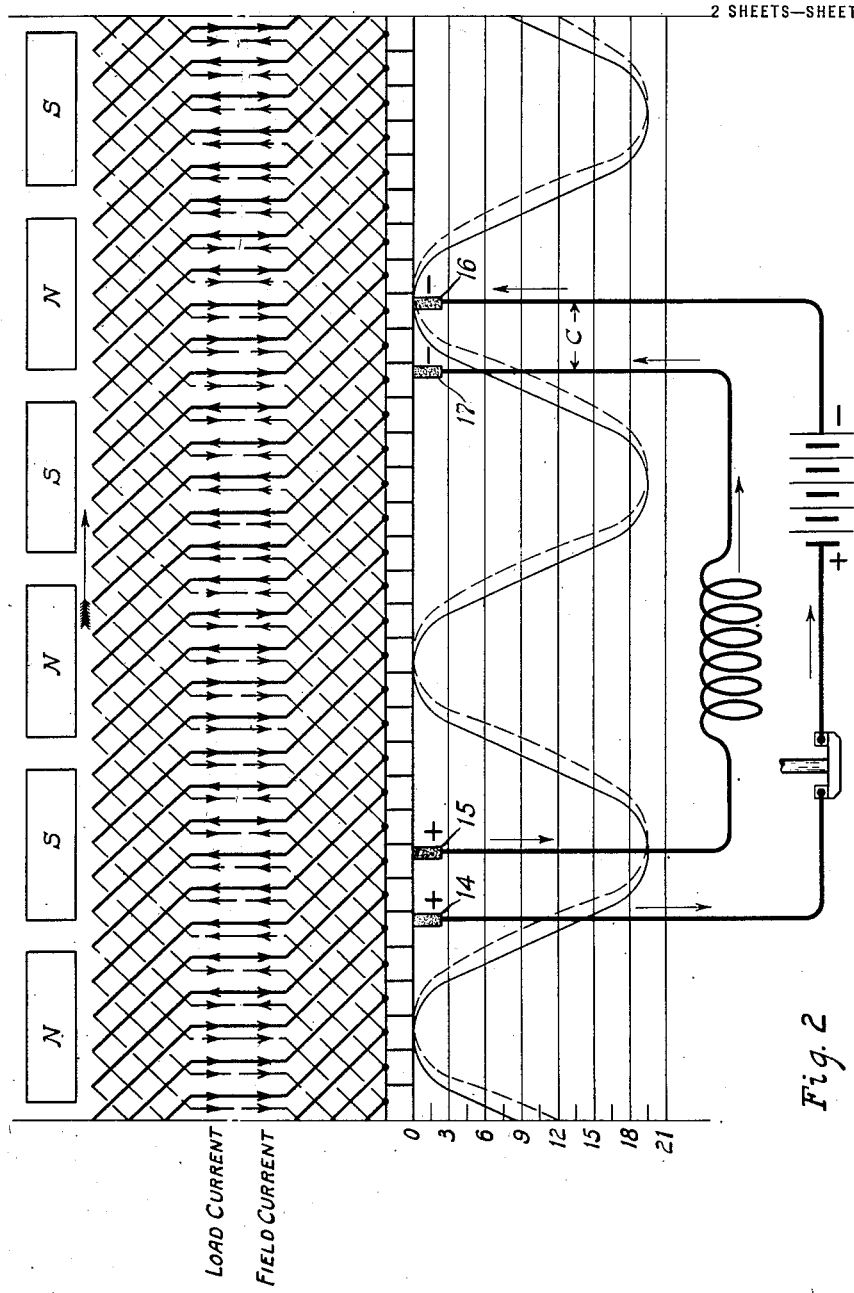
Fig. 2 is a diagrammatic development of the armature windings and illustrates diagrammatically the manner in which the generator output is determined.

An increase of speed, tending to bring about an increase in both the field and load currents will, by reason of the reaction of these currents upon the field flux, act to shift the resultant flux axis and consequently the distribution of voltage around the commutator indicated by the broken line curve in Fig. 2. This distortion of voltage will act to raise the potential on exciting brush 17, thereby reducing the potential difference across exciting brushes 15 and 17 and therefore result in a reduction in field current. At the same time, it will bring about a decrease in the potential existing on brush 14 and therefore a decrease in voltage impressed across the battery circuit. Consequently a substantially constant output may be maintained from the generator at varying speeds, and at all times the voltage across the field circuit will be maintained at a sufficiently high value that it will not be sensitive to variations in the location of the brushes or in the condition of the commutator or brush surface. It is quite obvious that characteristics of the dynamo-electric machine may be changed by varying the design of the windings and the positions of the brushes.

One embodiment of the present invention has been described in detail. Many modifications will suggest themselves to those skilled in the art. It is intended in this case to include all such modifications that fall within the scope of the invention as defined by the appended claims.

Having described my invention, what I claim as new and desire to secure by Letters Patent of the United States is:—

1. A dynamo-electric machine having field poles, an armature and a commutator, main brushes embracing less than one half of said commutator, auxiliary brushes embracing part of but less than the other half of said commutator, and a field circuit connecting said auxiliary brushes for providing excitation for said field poles.

2. A dynamo-electric machine having a rotatable armature provided with a commutator with diametrically placed relatively fixed points of maximum potential difference when said machine is running on open circuit, main brushes embracing less than one half of said commutator, one of said brushes being located substantially at one of said points, and auxiliary brushes embracing part of but less than the other half of said commutator, one of said auxiliary brushes being located at said other point.

3. A dynamo-electric machine having a field and an armature provided with a commutator with diametrically placed points of maximum potential difference when said machine is running on open circuit, a main brush located substantially at one of said points, a second main brush located less than 180 degrees from said first main brush, said main brushes being adapted to supply an outside circuit, an auxiliary brush located substantially at the other of said points, and a second auxiliary brush located less than 180 degrees from said first auxiliary brush, a field circuit connected to said auxiliary brushes to supply the field excitation of said dynamo-electric machine, said sets of brushes embracing arcs distinct from one another, whereby shifting of the field flux will reduce the voltage across each set of brushes.

4. A dynamo-electric machine having field poles and an armature whereby, when said machine is running on open circuit, waves of voltage values are produced with rounded crests and troughs approximately fixed relative to said field poles but which crests and troughs are shiftable by means of the armature cross flux when said machine is loaded, a set of brushes for collecting current from said armature between a crest and a point at which the voltage is raised when the armature cross flux acts, and another set of brushes for collecting current from said armature between a trough and a point at which the voltage is lowered when the cross flux acts, a field circuit connected between one of said sets of brushes to supply excitation for said field poles, the other of said sets being adapted to supply an outside circuit.

5. A dynamo-electric machine having field poles, an armature and brushes whereby upon operation of said machine upon open circuit an electromotive force is set up having a wave form including rounded crests and troughs approximately fixed relatively to said brushes, said wave form being shiftable by the action of the armature cross flux, one set of said brushes serving to collect current from said armature between a point corresponding in open circuit operation to a trough and a point whose voltage is lowered by the action of the armature cross flux, and another set of said brushes serving to collect current from said armature between a point corresponding in open circuit operation to a crest and a point whose voltage is raised by the action of the armature cross flux, a field circuit connected between one of said sets of brushes to supply excitation for said field poles, the other of said sets being adapted to supply an outside circuit.

6. A dynamo-electric machine having field poles and an armature, a main brush and an auxiliary brush located at points of maximum potential difference produced by said armature when operating on open circuit, a main brush and an auxiliary brush located at points the voltage of which changes materially under the influence of armature cross flux, said main brushes being adapted to supply an external circuit and a field circuit connected between said auxiliary brushes to supply the excitation for said field poles.

7. A dynamo-electric machine having a rotatable armature provided with a commutator with diametrically placed relatively fixed points of maximum potential difference when said machine is running on open circuit, main brushes embracing less than 180 electrical degrees of said commutator, auxiliary brushes embracing less than 180 electrical degrees of said commutator, a field circuit connected between said auxiliary brushes, one of said main brushes and one of said auxiliary brushes being located at opposite points of maximum potential difference, the other main brush and the other auxiliary brush being located at points whose potential difference with said first mentioned main and auxiliary brushes respectively decreases due to armature cross flux.

In witness whereof, I have hereunto subscribed my name.

WILLIAM A. TURBAYNE.